Figure 1:
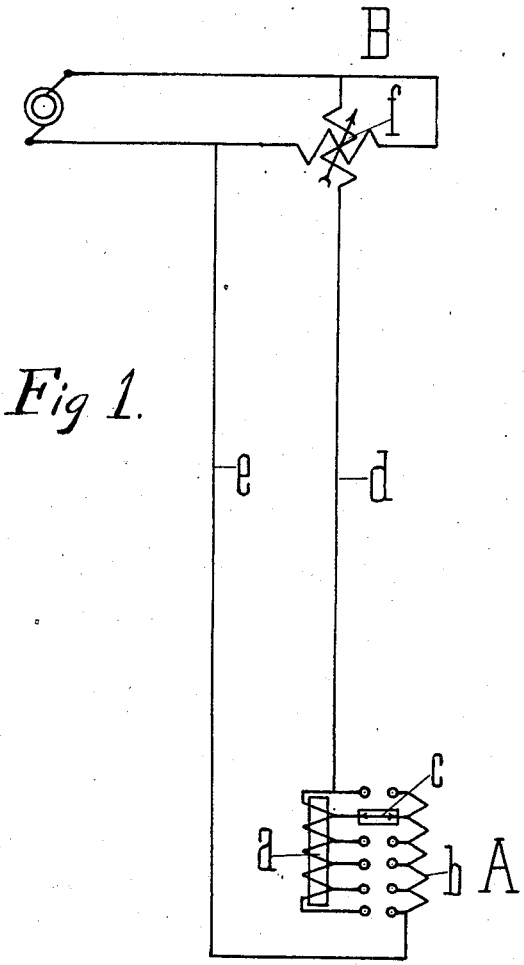

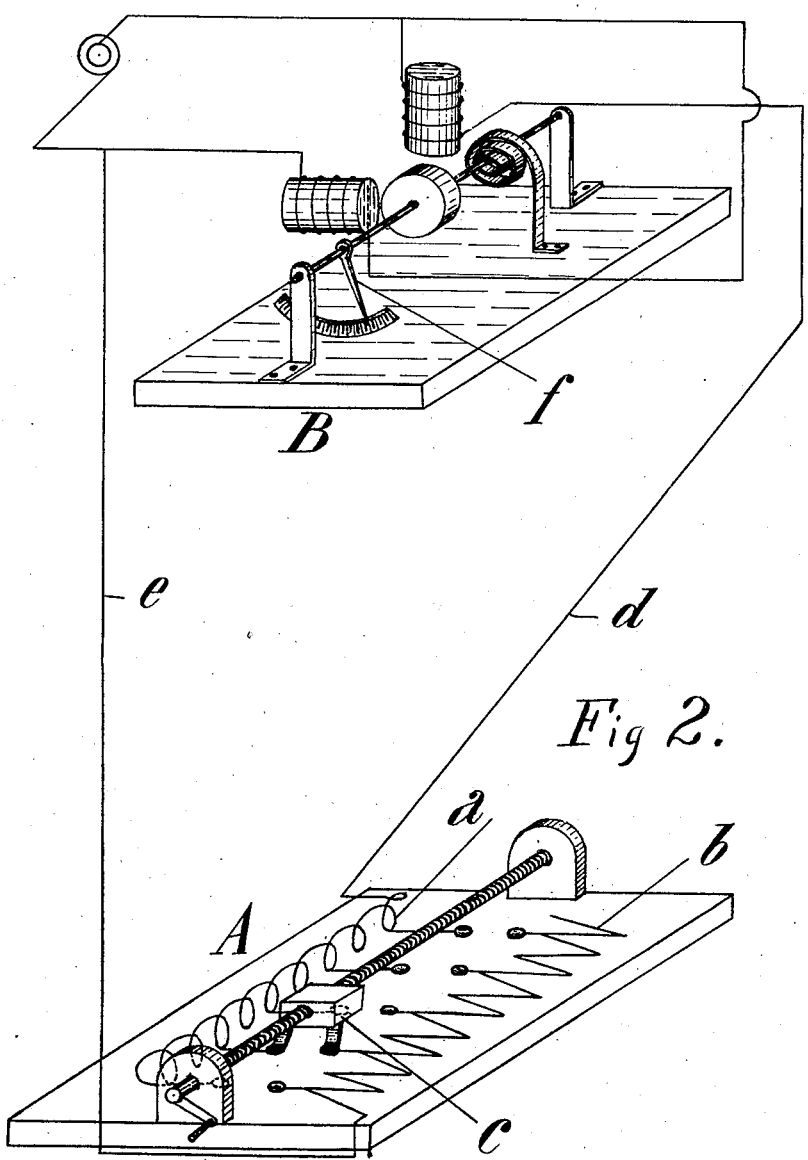

UNITED STATES PATENT OFFICE.

CARL MEYER, OF CHARLOTTENBURG, GERMANY.

ALTERNATING-CURRENT TELEGRAPH SYSTEM.

953,701. Specification of Letters Patent. Patented Apr. 5, 1910.

Application filed October 18, 1907. Serial No. 397,974.

*To all whom it may concern:*

Be it known that I, CARL MEYER, a subject of the German Emperor, and resident of No. 20 Grolmanstrasse, Charlottenburg, Germany, have invented certain new and useful Improvements in Alternating-Current Telegraph Systems, of which the following is a specification.

The present invention relates to apparatus for controlling the position of an indicating device from a distance by means of alternating currents.

By varying the phase between the current and the electromotive force in the conductors used in transmitting signals, I am able to reduce the number of wires between the transmitting and receiving stations to a minimum. Thus in a telegraph plant with one sending apparatus and one indicator, as represented in the accompanying drawing, only two connecting wires are required, of which, in a given case, when using the earth as return conductor, one can still be dispensed with.

The invention is represented in the accompanying drawing in two figures.

Figure 1 represents a diagram with one sending apparatus and one indicator. Fig. 2 shows the detail structure of the invention indicated in a diagram in Fig. 1.

In the sending apparatus the different displacements of phase of the current with regard to the electromotive force which corresponds with the different signals to be transmitted are effected in known manner. In the telegraph plant represented in the drawing, the sending apparatus A contains an inductive resistance $a$ and a non-inductive resistance $b$ which are connected with one another by the movable contact member $c$, so that when cutting out inductive resistance $a$, so much ohmic resistance $b$ is inserted into the circuit $d$, $e$, that the strength of current remains approximately constant, the current being merely displaced in phase with respect to the electromotive force. At the receiving place B an apparatus, say a phase measurer with a needle $f$ is put in the circuit $d$ $e$. With each signal to be transmitted from A to B, a certain difference of phase corresponds which is produced in the sending station A by setting the contact $c$ on different groups of resistance, whereupon the indicator placed at the receiving station B is set to the transmitted signal.

I claim:

In a needle telegraph for alternating currents in combination a generator for alternating currents, a plurality of electric circuits electrically connected with said generator and being joined in parallel, one coil in each of said circuits and said coils being arranged at an angle to each other and having adjacent their poles a turnable keeper with a needle, an inductive resistance and a resistance being free of induction intercalated in one of the said circuits, the one end of one of said resistances being connected with one of the poles and the other or opposite end of the other of said resistances being connected with the other pole of said one circuit in which they are both intercalated, both resistances having opposite contacts and a slidable contact member connecting both resistances regulatably.

CARL MEYER.

Witnesses:
JOHANNES MEYER,
MAX PASTOR.